United States Patent Office 3,238,241
Patented Mar. 1, 1966

3,238,241
SECONDARY PERHALOALKYL CHLORO-
SULFATES AND FLUOROSULFATES
Murray Hauptschein, Glenside, Pa., and Milton Braid, Haddon Heights, N.J., assignors to Pennsalt Chemicals Corporation, Philadelphia, Pa., a corporation of Pennsylvania
No Drawing. Filed Sept. 20, 1963, Ser. No. 310,499
4 Claims. (Cl. 260—456)

This application is a continuation-in-part of copending application, now abandoned, Serial No. 735,702, filed May 16, 1958, for Halogenated Organic Compounds, by Murray Hauptschein and Milton Braid.

This invention relates to secondary perhaloalkyl chlorosulfates and fluorosulfates of the general formula

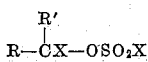

where R and R' are perfluoroalkyl or perfluorochloroalkyl radicals which may be the same or different and X represents chlorine or fluorine or both. As used herein, the term perfluoroalkyl radical means an alkyl radical containing only the elements fluorine and carbon. A perfluorochloroalkyl radical means an alkyl radical containing only the elements fluorine, chlorine and carbon in which the ratio of fluorine to chlorine atoms is at least 1:1.

The new secondary perhaloalkyl chlorosulfates and fluorosulfates of the invention are prepared by a new route involving the reaction of chlorosulfonic acid or fluorosulfonic acid with a perhalogenated iodide of the formula

where R, R' and X are as defined above. In this reaction, the chlorosulfate (OSO$_2$Cl) or fluorosulfate (OSO$_2$F) group replaces the iodine to form the corresponding halosulfate with the halosulfate group (OSO$_2$X) bonded to the carbon vacated by the iodine through an oxygen atom thus:

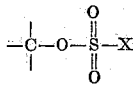

This reaction may be illustrated in the case of 2-iodoperfluorohexane and chlorosulfonic acid by the following equation:

Equation 1.

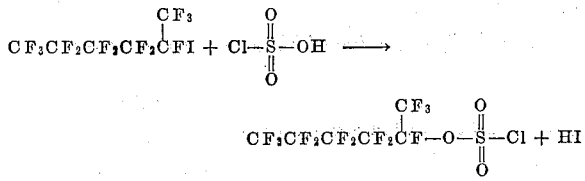

Iodine chlorides and sulfur dioxide are in general the inorganic products ultimately formed, probably as the result of the following reactions:

(2) 

(3) 

(4) 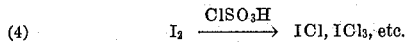

As will be shown in detail in the description which follows, the reaction of fluosulfonic or chlorosulfonic acid with these halogenated iodides produces the fluorosulfate or chlorosulfate, that is, compounds in which the sulfur of the fluosulfonic or chlorosulfonic acid is linked to a carbon atom through an oxygen atom

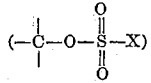

to the substantial exclusion of sulfonyl chlorides or fluorides

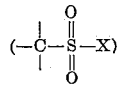

or sulfonic acids

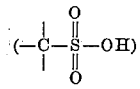

in which the sulfur of the chlorosulfonic group is linked directly to a carbon atom, and to the substantial exclusion also of sulfites

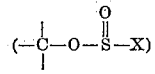

The stable secondary perhaloalkyl chlorosulfates and fluorosulfates provided by the present invention are a valuable class of compounds. Because they are halosulfates, with the sulfur bonded to the halogenated carbon atom through an oxygen atom, rather than sulfonic acids, in which the sulfur is bonded directly to the halogenated carbon, they undergo a unique hydrolysis reaction, which the corresponding hydrocarbon halosulfates do not undergo, to produce perhalogenated ketones. Reactions of this type may be illustrated in the case of the chlorosulfate

by the following:

(5) 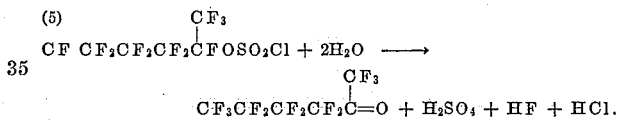

The secondary perhaloalkyl chlorosulfates and fluorosulfates of the invention are thus valuable stable intermediates for the preparation of valuable perhalogenated ketones many of which are difficult to prepare by other methods.

A particularly valuable class of compounds of the invention are those in which R and R' are perfluoroalkyl groups. From such halosulfates valuable perfluorinated ketones may be prepared.

While the number of carbon atoms in the radicals R and R' is not critical, preferably R will contain from 1 to 20 and most desirably from 1 to 10 carbon atoms whereas R' will contain from 1 to 6 and most desirably from 1 to 3 carbon atoms.

While the precursor perhalogenated iodides used to prepare the halosulfates of the invention may be obtained by any desired procedure, one convenient method for the preparation of these compounds is by addition of iodine monofluoride to perfluorinated or perfluorochlorinated olefins having at least 3 carbon atoms according to the procedures described in U.S. Patent 3,006,973. Suitable starting secondary iodides may also be obtained by the addition of iodine monochloride to similar fluorinated or perfluorochlorinated olefins having at least 3 carbon atoms by known procedures.

A class of secondary iodides of particular interest for conversion into the chlorosulfates and fluorosulfates of the invention are telomers of perfluoropropene or similar perfluorinated or perfluorochlorinated olefins having 3 or more carbon atoms, such for example as telomer iodides of the formula

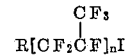

where R is a perfluoroalkyl or perfluorochloroalkyl radical and where $n$ is an integer from 1 to about 30 and preferably 1 to about 10. Telomer iodides of this type are described in U.S. Patent 3,083,238.

The following are specific examples of typical chlorosulfates and fluorosulfates provided by the invention.

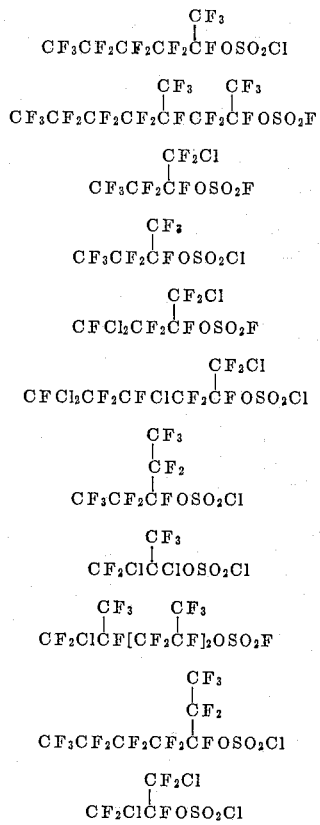

In the preparation of the compounds of the invention by the reaction of corresponding secondary perhalogenated iodides with chlorosulfonic or fluosulfonic acid, the reaction will generally be carried out at temperatures ranging from about 20° C. to 250° C. Generally speaking, the reaction rate increases with increasing temperature. Higher temperatures, however, tend to decrease the yield of halosulfate due to a competing reaction involving the conversion of the iodide to the chloride or fluoride by replacement of iodine with the chlorine or fluorine of the chlorosulfonic or fluosulfonic acid. Thus, the optimum temperature reaction will often be determined by the optimum balance between the temperatures that give reasonable rates and conversions and those which give the best yield to the desired halosulfate. Generally, the reaction of the iodide with chlorosulfonic acid proceeds more readily at a given temperature than with the fluosulfonic acid. Thus, the optimum temperature to form the fluosulfate may range from 10° C. to 100° C. higher than that found optimum for the chlorosulfate.

The reaction pressure is not critical. Thus, the reaction may be carried out at atmospheric pressure or even under slight vacuum, or if desired under any practical pressure ranging, for example, up to 50,000 pounds per square inch. Where the reactants are not volatile compounds the reaction is most conveniently carried out under atmospheric pressure. Where the reactants are low boiling, it is desirable to carry out the reaction in an autoclave, or other suitable pressure equipment, so as to maintain the reactants in the liquid phase at the particular reaction temperature involved. The reaction time is likewise not critical. The reaction periods ranging from a few minutes to a day may be used.

The molar ratio of the chlorosulfonic or fluosulfonic acid to the iodide is not critical but should generally be in the range of from 1:1 to 20:1 and preferably in the range of about 2:1 to 10:1. Molar ratios of the chlorosulfonic or fluosulfonic acid to iodide of less than 1:1 are wasteful of the starting iodide. An excess of the chlorosulfonic acid is preferable to insure complete reaction of the iodide.

To carry out the reaction, the halosulfonic acid and the starting iodide can be mixed together and then heated to the reaction temperature. In some cases it will be preferred to add the halosulfonic acid slowly to the iodide maintained at the desired reaction temperature.

The reaction may be conducted with or without a solvent. In general no solvent is required, although if desired halogenated solvents may be present.

Since some of the reactants, particularly the halosulfonic acids, and some of the reaction products, are corrosive, it is often preferable to conduct the reaction in glass or glass lined equipment or in metal equipment which is resistant to the corrosive influence of the reagents employed.

Since it is usually preferable to employ an excess of the halosulfonic acid, the reaction product will generally contain unreacted chlorosulfonic or fluosulfonic acid. The halosulfate may be separated from the halosulfonic acid by pouring the reaction mixture over crushed ice or into water held at 0° C. The halosulfonic acids being soluble in water will dissolve in the water and the halosulfates, being generally water insoluble, will separate as the lower organic layer. Use of low temperatures to effect this separation is important both from the standpoint of avoiding excessive heating when the halosulfonic acid dissolves in water, and to avoid hydrolysis of the halosulfate. In some cases, if the halosulfate boils at a sufficiently different temperature from the corresponding halosulfonic acid, it can be removed from the mixture without water washing by a simple distillation, although this procedure is not usually preferred. Iodine which is also usually formed in the reaction can be removed from the halosulfate by filtration, by selective solvent extraction, or other well known techniques.

In some cases, the separation of the crude halosulfate from excess halosulfonic acid may be accomplished simply by permitting the reaction mixture to stand, whereupon it separates into two phases, an organic phase containing the crude halosulfate and an inorganic phase containing mostly unreacted halosulfonic acid, after which the halosulfate may be recovered by simple decantation.

The crude halosulfate, after separation from the excess halosulfonic acid as described may be further purified by distillation or other well known techniques.

The following examples illustrate specific embodiments of the invention:

*Example 1.—Reaction of 2-iodoperfluorohexane with chlorosulfonic acid*

20 grams (0.17 mole) of chlorosulfonic acid and 5 grams (0.0112 mole) of the secondary perfluoroiodide $$CF_3CF_2CF_2CF_2CFICF_3$$

are sealed in a heavy walled-Pyrex ampule and heated at 148° C. for 112 hours. A mass of orange crystals of iodine trichloride forms at the bottom of the tube. The tube is then cooled and opened and the top layer, a clear yellow oil, is decanted. On warming to room temperature, sulfur dioxide gas is evolved. A small amount of additional oil is collected on hydrolysis of the iodine trichloride-acid layer, combined with the main fraction, washed with dilute potassium carbonate solution, dried with anhydrous calcium sulfate, and distilled to give entirely 2-chloroperfluorohexane,  having a boiling point of 83° to 84° C., and a refractive index $n_D^{26}$ 1.2826. No chlorosulfate appears to be formed in this reaction.

When the reaction is carried out at a lower temperature, the chlorosulfate forms together with the corresponding chloride. Thus, 17.8 grams (0.0399 mole) of 2-iodoperfluorohexane is reacted with 50 grams (0.429 mole) of chlorosulfonic acid in a sealed tube at 75° C. for 4.25 hours and at 95° C. for 2 hours respectively. Mainly unreacted iodide is recovered from these reactions, together with small amounts of 2-chloroperfluorohexane and perfluoro-2-hexylchlorosulfate, $$CF_3CF_2CF_2CF_2\underset{\underset{OSO_2Cl}{|}}{C}FCF_3$$

which is detected by infrared spectroscopic analyses. The formation of the perfluoro-2-hexylchlorosulfate is further confirmed by its hydrolysis to the perfluorocarboxylic acid $C_4F_9COOH$. The hydrolysis is carried out by shaking the reaction product, containing the chlorosulfate and unreacted iodide exhaustively with water at room temperature. The water insoluble lower layer is removed and a portion of the aqueous part is treated with an excess dilute aqueous sodium hydroxide solution. A small amount of gas (fluoroform) is liberated. After evaporation of the water, the residual solid salts are extracted in a Soxhlet apparatus with anhydrous ether. From the ether extract there is obtained after evaporation of the solvent a small amount of a sodium salt of the perfluorocarboxylic acid, as shown by the infrared spectrum, $$C_4F_9\overset{O}{\underset{\|}{C}}OH$$

This compound is produced by the initial formation of the secondary alcohol which loses HF to form the ketone $$C_4F_9\overset{O}{\underset{\|}{C}}CF_3$$

followed by the loss of fluoroform $CF_3H$ by the ketone in the presence of NaOH in accordance with the known haloform reaction. These reactions may be represented as follows:

$$C_4F_9CF(OSO_2Cl)CF_3 \xrightarrow{NaOH} [C_4F_9CFOHCF_3] \xrightarrow{-HF}$$
$$C_4F_9\overset{O}{\underset{\|}{C}}CF_3 \xrightarrow{NaOH} C_4F_9\overset{O}{\underset{\|}{C}}ONa + CF_3H$$

A second portion of the aqueous part is extracted exhaustively with ethyl ether, the ether extract treated with $P_2O_5$ and on distillation after removal of the ether, the perfluoroketone $$C_4F_9\overset{O}{\underset{\|}{C}}CF_3$$

B.P. about 53° C. is obtained.

*Example 2.—Reaction of $C_3R_7[CF_2CF(CF_3)]_2I$ with fluosulfonic acid*

35 grams (0.35 mole) of fluosulfonic acid and 18.5 grams (0.031 mole) of $C_3R_7[CF_2CF(CF_3)]_2I$ are sealed in a 75 cc. steel autoclave and heated for about 16 hours at 230° to 235° C. The vessel is cooled and opened and the liquid contents are hydrolyzed by cautiously pouring onto chipped ice. The lower layer is separated, dried and distilled in a small Vigreux distillation unit.

There is collected 8 grams of a liquid having a boiling point of from 85° C. to above 160° C., mainly (6 grams) boiling from 85° to 89° C. This product consists of the fluorosulfate $C_3R_7[CF_2CF(CF_3)]_2OSO_2F$ (as shown by the 6.7μ peak in the infrared spectrum) and the fluoride $C_3F_7[CF_2CF(CF_3)]_2F$.

*Example 3.—Reaction of*
$$CF_2ClCF(CF_3)CF_2CF(CF_3)CF_2CF(CF_3)I$$
*with fluosulfonic acid*

Following the procedures of Example 2, about 20 grams of the iodide $$CF_2ClCF(CF_3)CF_2CF(CF_3)CF_2CF(CF_3)I$$

prepared as described in U.S. Patent 3,083,238 is reacted with a 10 molar excess of fluosulfonic acid while sealed in a steel autoclave for about 15 hours at 230° C. There is obtained from this reaction a moderate yield of the secondary chlorosulfate $$CF_2ClCF(CF_3)CF_2CF(CF_3)CF_2\underset{\underset{CF_3}{|}}{C}FOSO_2F$$

*Example 4.—Reaction of*
$$CF_2Cl\underset{\underset{CF_3}{|}}{C}F(CF_2CF_2)_3CF_2\underset{\underset{CF_3}{|}}{C}FI$$
*with chlorosulfonic acid*

To 25 grams of the above iodide (prepared by the addition of perfluoropropene to the iodide $$CF_2Cl\underset{\underset{CF_3}{|}}{C}F[CF_2CF_2]_3I$$

according to the procedures described in U.S. Patent 3,083,238) there is slowly added over a period of 2 hours a ten fold molar excess of chlorosulfonic acid while maintaining a reaction temperature of 120° C. and stirring. After the addition is complete the reaction mixture is heated for an additional six hours with stirring at 120° C. The excess chlorosulfonic acid is removed and there is obtained a moderate yield of the chlorosulfate $$CF_2Cl\underset{\underset{CF_3}{|}}{C}F(CF_2CF_2)_3CF_2\underset{\underset{CF_3}{|}}{C}FOSO_2Cl$$

We claim:
1. A secondary perhaloalkyl halosulfate of the formula

$$R-\underset{\underset{R'}{|}}{C}XOSO_2X$$

where R and R' are selected from the class consisting of perfluoroalkyl and perfluorochloroalkyl wherein R contains up to twenty carbon atoms and R' contains up to six carbon atoms, where X is selected from the class consisting of fluorine and chlorine, and where said perfluorochloroalkyl contains a ratio of fluorine to chlorine of at least 1 to 1.

2. A halosulfate in accordance with claim 1 wherein R and R' are perfluoroalkyl, and R contains 1 to 10 carbon atoms and R' contains 1 to 3 carbon atoms.

3. A secondary perhaloalkyl halosulfate of the formula $$R-\underset{\underset{R'}{|}}{C}FOSO_2X$$

where R and R' are perfluoroalkyl wherein R contains up to twenty carbon atoms and R' contains up to six carbon atoms.

4. A secondary perhaloalkyl halosulfate in accordance with claim 3 in which R is perfluoroalkyl having from 1 to 10 carbon atoms and in which R' is perfluoroalkyl having from 1 to 3 carbon atoms.

References Cited by the Examiner

UNITED STATES PATENTS 2,628,972  2/1953  Calfee et al. _____ 260—456
2,878,156  3/1959  Davis _____ 260—456 X CHARLES B. PARKER, *Primary Examiner.*